United States Patent Office 3,556,750
Patented Jan. 19, 1971

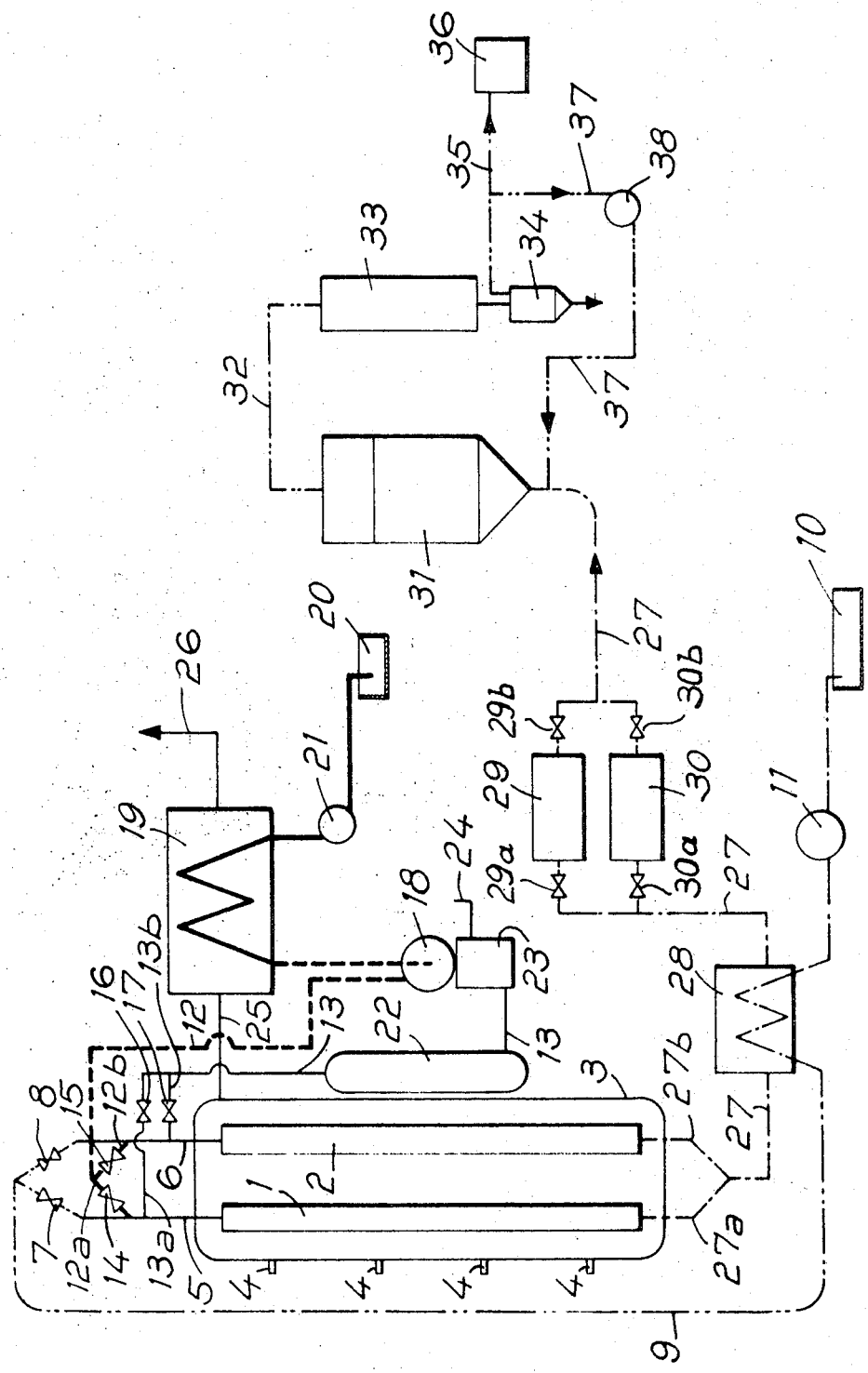

3,556,750
PROCESS FOR THE MANUFACTURE UNDER PRESSURE OF GASES WHICH MAY BE SUBSTITUTED FOR NATURAL GASES
Andre A. Salvadori and Carmelo A. Farrugia, Paris, Andre P. Lecoanet, Soisy-sur-Montmorency, and Philippe Lovy, deceased, late of Roissy-en-Brie, France, by Mrs. Philippe Lovy, born Louise Schmidt, administratrix, Roissy-en-Brie, France, assignors to Service National dit: Gaz de France, Paris County, France
Filed July 26, 1967, Ser. No. 657,470
Claims priority, application France, July 26, 1966, 70,813
Int. Cl. B01j 9/04, 11/04; C01b 2/16
U.S. Cl. 48—197
4 Claims

ABSTRACT OF THE DISCLOSURE

An installation for manufacturing gas under pressure in which liquid or gaseous petroleum hydrocarbons are cracked under pressure on a weak catalyst in the presence of steam in a first series of reactors, while simultaneously, in another series of reactors the used weak catalyst is regenerated by means of a certain quantity of steam and air at the same pressure as the cracking process. This cracking and regeneration being carried out while external heat is continuously applied. The gases resulting from the cracking and regeneration process being mixed together to form a basic gas which is purified at the same pressure as that used during the cracking process and then subjected to an auto-hydrogenation process in the presence of a second catalyst including a metal of the platinum family.

---

The present invention relates to a process and an installation for the manufacture under pressure of combustible gas which may be substituted completely for natural gases, from liquid and gaseous hydrocarbons such as crude oil, light distillates, propane, etc.

Processes of this type have already been proposed in which there is first carried out a thermal cracking under pressure of the petroleum hydrocarbons on a contact mass having weak catalytic activity so as to obtain a basic gas containing a large percentage of methane and of which the content of unsaturated hydrocarbons is substantially equal to that in hydrogen, the basic gas being thereafter subjected to an auto-hydrogenation in the presence of a catalytic mass including a metal preferably from the platinum family.

Other known processes also function continually on very active catalysts and lead to the fomation of a final gas containing above all methane without higher hydrocarbons and a not negligible quantity of hydrogen, so that only those gases which are badly situated in the gas-interchangeability diagram of the second family of gases are produced and these processes require frequent stoppages of varying duration for the purpose of renewing or regenerating the adulterated catalysts. Moreover, these processes have the disadvantage of only being able to treat relatively light hydrocarbons devoid of sulphur compounds. In addition these known processes require a long succession of balanced reactions which can only be effected separately in a series of individual apparatus stages.

The present invention eliminates the aforesaid disadvantages and particularly has for an object to provide a process of manufacturing under pressure a gas which may be substituted completely for natural gases, which process is of the type including a thermal cracking under pressure of liquid and gaseous petroleum hydrocarbons on weak catalysts in the presence of steam followed by a purification of the basic gas produced and thereafter an auto-hydrogenation of this purified basic gas in the presence of a catalyst comprising a metal preferably of the platinum family. The process according to the invention must enable an extensive range of starting materials in the form of liquid and/or gaseous crude petroleum products to be used and must enable a final gas to be obtained which may be substituted completely for natural gases, which final gas includes almost all the elementary constituents of the starting materials, possesses a calorific power comparable with that of natural gases, and which is produced at a pressure at least equal to that which prevails in the transport conduits for gas going towards the points where they are used.

To this end, the process according to the present invention is characterized in that cracking is carried out alternately and successively in at least two series of reactors in one of which there is formed, under a pressure greater than atmospheric pressure and in the presence of steam, the weak catalytic cracking whilst simultaneously, in the other series of reactors, the regeneration of the catalytic mass is carried out by means of a certain quantity of steam and at the same pressure as that employed for the cracking using also a certain quantity of air, the cracking and the regeneration being performed with a continuous supply of external heat; that the gases provided by the regeneration are added to the gas from the cracking in order to obtain a basic gas; and in that the catalytic auto-hydrogenation at low temperature of this basic gas which is preferably purified beforehand is carried out at the same pressure as that used for the cracking.

By means of this process of the invention, there is obtained a final gas completely interchangeable with natural gases, which has nearly all the elementary constituents of the starting materials in the form of gaseous compounds having high calorific power, which has sufficiently small hydrogen content and which is at a pressure at least equal to that prevailing in the gas conduits leading to the points where the gas is to be used.

The present invention also has for an object to provide an installation for carrying out the aforesaid process and comprising an assembly of cracking-reactors provided with weak catalysts and connected on the one hand upstream thereof to a pump for supplying petroleum hydrocarbons and to a source of steam under pressure and on the other hand downstream thereof to a heat-exchanger followed by a device for eliminating sulphuretted hydrogen and by an auto-hydrogenation reactor whose output is connected to a condenser which, at its down stream end, communicates with an expansion chamber discharging into the distribution conduits, this installation being characterized in that it comprises at least two series of cracking reactors in the form of tubes disposed in a common heating chamber, provided at their input with closure valves and connected, on the one hand, upstream of each series to a source of compressed air provided parallel to the conduits supplying petroleum hydrocarbons and steam, a gas reservoir being interposed between the air-source and the closure valves of the two series of reactors, and on the other hand, the reactors are connected down-stream thereof to the heat exchanger by means of a conduit common to the two reactors.

By means of the installation of the invention, a cyclic process can be carried out whereby the source of steam under pressure is constantly connected to the series of cracking reactors, the source of compressed air is connected intermittently to one of the series of cracking reactors whilst the other one or more series of reactors serves for cracking the crude hydrocarbons. The tars formed during the cracking phase are transformed at least partially into carbon in the lower and hottest part of the reactors without being entrained by the gases, but this carbon is thereafter oxidized by the air and steam under pressure during the regeneration phase and added to the gases leaving the reactors working in the cracking phase.

Other characteristics and advantages of the invention will appear from the following description of one embodiment of the installation according to the invention, given by way of example with reference to the accompanying drawing in which:

The single figure shows schematically a preferred embodiment of the installation for the manufacture under pressure of gases which may be substituted completely for natural gases.

As can be seen from the drawing, two series of identical cracking reactors 1 and 2 are disposed in a heating chamber 3 provided with a plurality of burners 4. These reactors 1 and 2 are constituted by long tubes provided over a large part of their length with a charge, contact mass or weak catalysts such as the refractory oxides either pure or mixed, silicon carbide, etc.

The input of each cracking reactor communicates with feed ducts 5 and 6 on each of which are mounted closure valves 7 and 8. These different feed ducts 5 and 6 are joined upstream of the valves 7 and 8 and connected by means of a principal feed duct 9 to a source of crude petroleum hydrocarbons 10, for example liquids, a feed pump 11 being connected in the principal conduit 9.

Between the input to the reactors 1 and 2 and the closure valves 7 and 8, steam ducts 12a and 12b and a compressed air duct 13a and 13b discharge into each of the feed conduits 5 and 6, closure valves 14, 15, 16 and 17 being mounted on each duct before the duct joins the corresponding feed duct 5 and 6. Down-stream of the closure valves 14, 15, 16 and 17, the steam ducts 12a, 12b and the compressed air ducts 13a and 13b are joined to form single general duct 12, 13 respectively. In the general steam duct 12 is provided a turbine 18. This duct 12 passes upstream of the turbine 18 through a heat exchanger 19 and has a lift pump disposed between the latter and a source of water 20. The general compressed air duct 13 communicates with an air-reservoir 22 before arriving at the output of an air-compressor 23 whose intake duct 24 opens directly to the atmosphere. The exchanger 19 is heated by the combustion gases coming through a duct 25 of the heating chamber 3 and escaping from the exchanger 19 by a chimney 26. It can be advantageous to provide, for feeding steam, additional ducts provided with valves functioning preferably so as to be either on or off.

The output ducts 27a, 27b of each cracking reactor are joined downstream of the latter by a single evacuation duct 27 for the basic gas. This evacuation duct 27 is mounted at the two ends of a second heat exchanger 28 through which passes the principal feed duct 9 for hydrocarbons. To purifying units for removing $H_2S$ 29, 30 are mounted in parallel downstream of the heat-exchanger 28. A closure valve 29a, 29b and 30a, 30b is provided at each end of the corresponding purifying unit 29, 30 filled with a granulated iron oxide or zinc oxide.

Thereafter, the evacuation duct 27 for the basic gases is connected to the input of an auto-hydrogenation reactor 31 provided with a catalyst constituted by a metal preferably of the platinum family, such as palladium. The output of the auto-hydrogenation reactor 31 communicates by means of a duct 32 with a condenser 33 whose output is connected to a separator 34. The gas output of the separator 34 is connected on the one hand through a conduit 35 to an expansion chamber 36 which regulates the pressure prevailing in the installation and enables it to be controlled, and on the other hand, through a recycling circuit 37 provided with a lift pump 38 to the input of the auto-hydrogenation reactor 31.

It is not absolutely necessary to provide this recycling circuit 37. In this case, an auto-hydrogenation reactor having an internal cooling circuit can be used.

In some cases, it is advantageous to provide between the output of the cracking reactors and the $H_2S$ purifying units a condenser mounted in series with a pressure washing unit for the basic gas using a suitable liquid, such as a petroleum fraction which can thereafter be used in the burners 4 for providing a part of the heat for the cracking reactors 1 and 2.

The process using the above described installation comprises the following operations: In the heating chamber 3 the tubular reactors 1 and 2 are brought to a convenient temperature for cracking the crude petroleum hydrocarbons, the external heating of the reactors 1 and 2 being carried out continuously and at atmospheric pressure. The feed pump 11 continuously lifts the petroleum hydrocarbons, preferably liquids, towards the heat-exchanger 28 where these hydrocarbons are preheated to about 350° C., at which point they vaporize and are then sent through the principal feed duct 9, the open valve 7 for example, and the ducts 5 in the first series of reactors 1. At the same time, there is added in the conduits 5 a certain quantity of steam under pressure through the duct 12, the ducts 12a and the open valves 14, the production of the steam being ensured by the exchanger 19 which is traversed by the combustion gases coming from the chamber 3 and escaping to the atmosphere through the chimney 26. Simultaneously with this operation, the second series of reactors 2 is working to provide regeneration at the same pressure as that under which the reactors 1 are working in the cracking phase. During the regeneration phase, the series of reactors 2 communicates with the steam duct 12, the valves 15 of the corresponding ducts 12b being open. An injection of compressed air is also carried out in the reactors 2, through the ducts 13b and the valve 17 but this injection is a security measure to avoid accidental combustion of the cracking gas and to enable a complete oxidation of the carbon deposits to be effected, is slightly out of phase in time with respect to the commencement of the introduction of steam in the same reactors 2 and ends before the end of the regeneration phase. The quantities of steam passing into the two series of reactors are preferably the same, but if an additional quanity of steam is necessary in the reactors in the cracking phase, the aforesaid additional ducts can advantageously be used. The turbine 18 functions continuously as does the compressor 23 whose reservoir 22 serves to equalize the fluctuations in pressure due to the intermittent discharges of the compressed air.

Whilst the manufacture of a cracking gas of high calorific power is carried out in the series of reactors 1, there is carried out simultaneously with this operation in the other series of reactors 2 an oxidation of the products which contain certain quantities of carbon and which are deposited on the catalysts during the preceding phase where these same reactors serve for the manufacture of the cracking gas. The gaseous products of the regeneration phase in the reactors 2 are added by means of the ducts 27b to the cracking gas leaving the first series of reactors 1 by the ducts 27a to form the basic gas, which enables the whole of the carbon deposits formed during the cracking to be recovered in the reactors 2 when regenerating, and thus enables nearly the whole of the elementary constituents of the starting material to be gasified. After a relatively short working period, of the order of a few minutes, the connections at the entry of the reactors 1 and 2 are reversed or cut off and formed so that the reactors 1 work again as regenerators whilst the reactors 2 serve for the production of the cracking gas. In order to carry out this inversion, it is merely necessary to actuate the valves 7 and 8, and then the valves 16 and 17 in the appropriate direction, the valves 14 and 15 generally remaining permanently open whilst some of the valves mounted on the additional steam ducts are open and some closed alternately.

The mixture of steam and crude hydrocarbons in the catalysts, particularly those hydrocarbons in a gaseous state which are fed to the reactors during the phase in which the cracking gas is produced, have a ratio by weight preferably near to 1. The pressures used in the reactors 1 and 2 are preferably between 10 and 70 bars and are chosen according to the conditions of operation which determine the pressure value. The pressure is substantially constant in the reactors 1 and 2 whichever working phase is being performed by the latter. The reactor temperature is chosen as a function of the pressure in such a manner as to maintain the composition of the basic gas constant by regulating the calorific discharge of the burners 4.

According to the principle of the process of the present invention, the durations of the regeneration and cracking phases are the same. Only the period of injection of compressed air is slightly shorter than the period of regeneration. The quantity of air used is of the order of 10 to 15% by weight of the total discharge of gas made.

By way of example, there is given hereunder the percentage volumetric composition of a basic gas obtained at the output of the reactors 1 and 2 under a pressure of 10 bars at a temperature of 750° C. and on a charge of silicon carbide.

| | |
|---|---|
| $H_2$ | 16.2 |
| $CH_4$ | 41.4 |
| $C_2H_6$ | 7.9 |
| $C_2H_4$ | 16.6 |
| $C_xH_y$ | 4.8 |
| $CO+CO_2$ | 5.1 |
| $N_2$ | 8.0 |

It will be seen that the basic gas contains a considerable percentage of hydrocarbons higher than methane, which enables an appreciable quantity of nitrogen to be tolerated in the final gas without prejudice to the calorific power of the final gas after auto-hydrogenation, such nitrogen resulting from the use of compressed air in the reactors during the regeneration phase.

The elongated tubular form of the reactors 1 and 2 and the external heating are favourable to the elimination of tars. In processes using internal heating, the height of the contact mass, i.e. of the catalysts, is small and the temperature falls considerably from the input of the reaction mixture to the output of the gases. By contrast, in the cyclic process using external heating according to the invention, the height of the catalytic layer is considerable and the temperature gradient is reversed. The injection of the fluids into the series of reactors 1 and 2 during the manufacturing and regeneration phases is preferably carried out from top to bottom. Under these conditions, the tars formed are partially converted into carbon in the lower part of the reactor which is the hottest part, without being entrained in the gas. This carbon is then oxidized by the air and steam during the regeneration phase.

As a function of the operating conditions prevailing in the present process (temperature, pressure, flow rates), the content of condensable products at the ambient temperature (which prevails in the gas at the output of reactors 1 and 2) is generally nil, or in the least favourable case reaches 20% by weight of the starting material. A physical purification is then necessary; the condensates collected can thereafter be used in the burners to contribute to the heating of reactors.

The basic gas, after having lost a portion of its heat in the heat exchanger 28, passes by means of the duct 27 through one of the two purifying units 29, 30 where the sulphuretted hydrogen contained in the basic gas eliminated.

The purified basic gas without sulphuretted hydrogen but possibly containing other sulphur compounds, is then passed into the auto-hydrogenation reactor 31. As is well known, for certain catalysts based on palladium, only the sulphuretted hydrogen amongst the sulphur compounds contained in the basic gas tends to adulterate the catalysts.

In other words, this stability of the activity of palladium in the presence of organic sulphur compounds enables crude petroleum hydrocarbons to be treated without previous desulphurisation. Consequently, the process according to the invention does not require prior desulphurisation of the starting material and thus eliminates the employment of an auxiliary device for the production of hydrogen which would be necessary for the said desulphurisation.

The reaction of auto-hydrogenation to which the basic gases are subjected in the reactor 31 is exothermic and commences at the ambient temperature. The regulation of the temperature prevailing in the auto-hydrogenation reactor 31 can be performed by means of the recycling circuit 37, 38 returning to the reactor 31 a portion of the gas cooled in the condenser 33. For the temperature regulation of the final gas, there can also be used an auto-hydrogenation reactor provided with a group of tubes traversed by the gases and cooled by a controllable stream of water which surrounds the tubes.

The final gas produced, for example at a pressure of 10 bars and at the ambient temperature, by auto-hydrogenation from the basic gas having the foregoing composition has the following percentage volumetric composition:

| | |
|---|---|
| $H_2$ | 2.0 |
| $CH_4$ | 48.4 |
| $C_2H_6$ | 25.6 |
| $C_2H_4$ | 3.0 |
| $C_xH_y$ | 5.6 |
| $CO+CO_2$ | 6.0 |
| $N_2$ | 9.4 |

The condenser 33 serves for cooling the final gas leaving the reactor 31 which gas passes again through the separator 34 before the remaining gaseous components are passed to the distributor 36. It is important to know that throughout the whole installation, the cracking gas, the basic gas and then the final gas are at substantially the same pressure which is at least equal to that prevailing in the expansion chamber 36 and the gas ducts leading to the consumption points.

The alternative and successive functioning of the two series of reactors 1 and 2 in the manufacturing and regeneration phases is controlled by automatic timing devices acting on the different valves.

The quantities of air used during each regeneration phase are relatively small, i.e. in the region of 35 Nm.³ of air per phase lasting for two minutes for an installation producing 250,000 Nm.³ of final gas per day. Thus, it is advantageous to operate the compressor 23 continuously and to provide downstream of the latter the reservoir 22 to smooth the fluctuations of pressure coming from the compressor and caused by actuation of the valves 16, 17.

Another advantage of the present process consists in the conversion into gas of a very large part of the carbon of the crude hydrocarbons. The quantity of carbon attained is frequently 100% and is never less than 80%. In addition, the steam consumption for the cracking and regeration reactions is small.

In the case where starting materials such as heavy hydrocarbons are used, it is advantageous to modify the above described process in order to recover, in the reactor working in the regeneration phase, all the carbon formed during the previous cracking phase in this same reactor, and to delay for as long as possible the deposit of carbon in the reactor working in the cracking phase.

To this end, the process previously described, in which the cracking is carried out alternately and successively in at least two series of reactors, in one of which is performed, under a pressure higher than atmospheric pressure, and in the presence of steam, the weak catalytic cracking, whilst simultaneously, in the other series of reactors, regeneration of the catalytic mass is performed by means of a certain quantity of steam and at the same pressure as that employed for the cracking, using also a certain quantity of air, the cracking and regeneration being performed with a continuous addition of external heat, is characterized according to the invention in that there is added in the series of reactors working in the cracking phase a quantity of air such that the nitrogen content of the gas leaving these reactors is about 10% of this gas, whilst the gas leaving the series of reactors working in the regeneration phase is passed to the burners.

This variant of the process according to the invention enables the formation of carbon in the reactors working in the cracking phase to be considerably delayed and at the same time ensures the addition of nitrogen to the basic gas leaving the cracking reactors and which passes to the catalytic auto-hydrogenation reactor and is essential to render the final gas leaving the auto-hydrogenation reactor interchangeable with natural gas.

Moreover, since the gases leaving the series of reactors working in the regeneration phase are passed to the burners, it is possible to use for this phase quantities of air greater than those used during the cracking phase, so that during the regeneration phase the recovery of residual carbon is clearly improved by the heating due to the combustion.

Again, the respective durations of the cracking phase, i.e. the phase in which the basic gas is manufactured, and the regeneration phase, can be prolonged considerably with respect to the durations of the phases envisaged for the first type of process according to the invention, because the use of air during the cracking phase enables the amount of carbon deposited to be reduced, which carbon must be recovered during the following regeneration phase.

The installation used for this variant of the process of the invention requires only insignificant modifications to that used for the first type of process of the invention. In effect, it is sufficient to provide for each output of the series of reactors 1 and 2 an independent evacuation duct passing through the heat exchanger, and to provide on each duct at the output of this exchanger, a three-way valve, one branch of this valve being connected to the duct 27 leading towards the purifying unit 29 and 30, and the other branch being connected to the burners.

Since the gases of the reactors working in the regeneration phase are also under a relatively high pressure, it is necessary to provide, upstream of the burners, a pressure-reducer or expansion chamber. Downstream of the series of reactors 1 and 2, the installation is not subjected to any modification for the production of the total quantity of air necessary, which quantity is the sum of the quantities of cracking and regenerating air. A single air-compressor 23 working continuously is employed, together with two valves 16 and 17 and corresponding ducts 13, 13a and 13b, which enable the air to be divided into several fractions and into different quantities to be directed alternately into the different series of reactors 1 and 2. It will be observed that the total quantity of air used for the regeneration phase and for the cracking phase is constant at each instant.

By way of example, there is given hereunder the volumetric percentage composition of a basic gas obtained at the output of one of the series of reactors 1 and 2 using a charge of silicon carbide:

| | |
|---|---|
| $H_2$ | 13.2 |
| $CH_4$ | 45.2 |
| $C_2H_6$ | 7.0 |
| $C_2H_4$ | 16.9 |
| $C_xH_y$ | 5.4 |
| $CO+CO_2$ | 1.7 |
| $N_2$ | 10.6 |

This cracking or basic gas was manufactured using a ratio by weight of $$\frac{H_2O}{\text{hydrocarbons}} = 1.0$$

and a time of passage in the reactor of two seconds.

The final gas produced, for example, at a pressure of 10 bars and at the ambient temperature, by auto-hydrogenation from the basic gas having the foregoing composition, has the following percentage volumetric composition:

| | |
|---|---|
| $H_2$ | 1.0 |
| $CH_4$ | 51.6 |
| $C_2H_6$ | 19.7 |
| $C_2H_4$ | 7.5 |
| $C_xH_y$ | 6.2 |
| $CO+CO_2$ | 1.9 |
| $N_2$ | 12.1 |

This gas, having been subjected to auto-hydrogenation, is effectively interchangeable with natural gas.

Of course, the process of the invention described above can be modified without departing from the scope of the invention.

What is claimed is:

1. A process for the manufacture from liquid and gaseous petroleum products of combustible gas which may be substituted for natural gas comprising the steps:
   (a) preheating said petroleum products to thereby convert them to a vapor state;
   (b) feeding said preheated petroleum vapor in the presence of steam and at superatmospheric pressure through a contact mass in a first set of externally heated reactors to subject said petroleum vapor to cracking conditions;
   (c) stopping the cracking operation in the first set of reactors after a period of a few minutes and feeding said preheated petroleum vapor and steam through a contact mass of the same composition as that in the first set of reactors but located in a second set of reactors where said preheated petroleum vapor is subjected to cracking under the same conditions as in the first set of reactors while simultaneously effecting in the first set of reactors a regeneration of the contact mass by feeding into said externally heated reactors steam and air at the same pressure as that employed in the cracking step;
   (d) reversing after a few minutes the functions of the reactors so that cracking of petroleum vapor occurs in the first set of reactors and regeneration of the contact mass occurs in the second set of reactors, and continuously thereafter reversing the functions of said reactors at intervals of a few minutes;
   (e) mixing the gases resulting from the cracking steps with the gases resulting from the regeneration steps to make a basic gas containing hydrogen sulfide;
   (f) removing hydrogen sulfide from said basic gas; and
   (g) subjecting the purified basic gas to an auto-hydrogenation operation at the same pressure as that used in the cracking and regeneration steps and in the presence of a catalyst including a metal of the platinum group.

2. The process of claim 1 wherein the durations of the cracking step in one set of reactors and the regeneration step in the other set of reactors are equal.

3. The process of claim 1 wherein the quantity of steam used for the cracking step is at least equal to that employed for the regeneration step.

4. The process of claim 1 wherein the duration of air injection during the regeneration step is shorter than that of the steam input, the air injection commencing after the start and ending before the finish of the regeneration step.

References Cited

UNITED STATES PATENTS

| | | | |
|---|---|---|---|
| 1,989,927 | 2/1935 | Houdry | 23—288X |
| 2,711,419 | 6/1955 | Milbourne et al. | 48—197X |
| 3,104,957 | 9/1963 | Porter et al. | 48—197 |

FOREIGN PATENTS 759,784  10/1956  Great Britain _____ 48—214

JOSEPH SCOVRONEK, Primary Examiner

U.S. Cl. X.R.

23—260, 288; 48—93, 94, 105, 213, 214; 252—416